United States Patent
Varghes et al.

(10) Patent No.: US 10,725,985 B2
(45) Date of Patent: Jul. 28, 2020

(54) SYSTEM AND METHOD FOR ENTERPRISE DATA QUALITY PROCESSING

(71) Applicant: Metropolitan Life Insurance Co., New York, NY (US)

(72) Inventors: John Varghes, New York, NY (US); Laura Heeger, New York, NY (US); Jonathan Corbett, New York, NY (US); Anthony Stern, New York, NY (US)

(73) Assignee: Metropolitan Life Insurance Co., New York, NY (US)

(*) Notice: Subject to any disclaimer, the term of this patent is extended or adjusted under 35 U.S.C. 154(b) by 238 days.

(21) Appl. No.: 15/049,785

(22) Filed: Feb. 22, 2016

(65) Prior Publication Data
US 2016/0246823 A1 Aug. 25, 2016

Related U.S. Application Data

(60) Provisional application No. 62/118,840, filed on Feb. 20, 2015.

(51) Int. Cl.
| | |
|---|---|
| *G06F 7/02* | (2006.01) |
| *G06F 16/00* | (2019.01) |
| *G06F 16/21* | (2019.01) |
| *G06Q 40/00* | (2012.01) |
| *G06F 16/215* | (2019.01) |
| *G06F 16/35* | (2019.01) |
| *G06F 16/2455* | (2019.01) |

(52) U.S. Cl.
CPC .......... *G06F 16/219* (2019.01); *G06F 16/215* (2019.01); *G06Q 40/123* (2013.12); *G06F 16/24564* (2019.01); *G06F 16/353* (2019.01)

(58) Field of Classification Search
CPC ........ G06Q 40/00; G06Q 40/06; G06Q 40/12; G06Q 40/123; G06F 17/30707; G06F 17/30507; G06F 17/30303; G06F 17/30309
See application file for complete search history.

(56) References Cited

U.S. PATENT DOCUMENTS

| | | | | |
|---|---|---|---|---|
| 9,202,249 B1* | 12/2015 | Cohen | ..................... | G06Q 40/12 |
| 2004/0162742 A1* | 8/2004 | Stoker | ................... | G06Q 10/06 |
| | | | | 707/758 |

(Continued)

*Primary Examiner* — Bruce M Moser
(74) *Attorney, Agent, or Firm* — Adam P. Daniels; Polsinelli

(57) ABSTRACT

A system for a financial institution (or vendor thereof) to comply with its due diligence, reporting and monitoring obligations under FACTA or similar regulations. The present invention deploys a computer-based Enterprise Data Quality (EDQ) platform for the collection and management of customer financial data. The platform is configured to profile and validate the quality of existing database structures and content and, to the extent necessary to achieve regulatory compliance, normalize and standardize database records. The platform is further configured to detect and flag data anomalies, and provides an automatic alert distribution feature. The EDQ platform further includes a reporting feature to enable an accessible audit trail. The platform gathers data feeds from existing systems and supports the collection of data from new customers.

10 Claims, 3 Drawing Sheets

(56) References Cited

U.S. PATENT DOCUMENTS

| | | | |
|---|---|---|---|
| 2006/0106700 A1* | 5/2006 | Boren | G06Q 20/4016 705/35 |
| 2013/0226546 A1* | 8/2013 | Suyeyasu | G06F 17/5004 703/6 |
| 2014/0222655 A1* | 8/2014 | Cummings | G06Q 30/0185 705/38 |
| 2015/0142680 A1* | 5/2015 | Baldassano | G06Q 30/018 705/317 |
| 2016/0004605 A1* | 1/2016 | Ahn | G06F 16/00 707/679 |
| 2016/0140668 A1* | 5/2016 | Maguire | G06Q 40/123 705/31 |
| 2017/0017887 A1* | 1/2017 | Waradkar | G06N 5/04 |
| 2017/0147630 A1* | 5/2017 | Scott | G06F 17/30371 |
| 2017/0199757 A1* | 7/2017 | Fountain | G06F 9/466 |

* cited by examiner

SYSTEM AND METHOD FOR ENTERPRISE DATA QUALITY PROCESSING

CROSS REFERENCE TO RELATED APPLICATION

The present application is a Non-Provisional application of U.S. Provisional Application Ser. No. 62/118,840, filed on Feb. 20, 2015. The contents of that application is incorporated herein by reference.

BACKGROUND

Foreign Account Tax Compliance Act (FATCA) creates tax reporting and withholding burdens on financial institutions under United States law. Primarily, it is designed to combat tax evasion by U.S. citizens, and requires financial institutions around the world to conduct due diligence on customers and counterparty payees and to report information.

At its core, FATCA is about collecting documentation and reporting information on customer accounts and counterparty payees to demonstrate compliance to the U.S. tax authority, the Internal Revenue Service (IRS). Under FATCA, U.S. taxpayers with specified foreign financial assets that exceed certain thresholds must report those assets to the IRS. Under FATCA, withholding agents must withhold tax on certain payments to foreign financial institutions that do not agree to report certain information to the IRS about their U.S. accounts or accounts of certain foreign entities with substantial U.S. owners.

Financial services institutions typically store and maintain vast repositories of customer data and records on centralized databases. However, different business units and office locations within an organization and even different databases within the same office location often apply different syntax and taxonomies to the stored data. The customer data will then be formatted differently and include different types of information depending on how a particular database is structured. This presents substantial difficulties to the financial services institution in meeting its documentation and reporting obligations under FATCA that scale as the size of size and number of the customer databases increase. A strong data and process solution is required to support auditability within the data collection screening and reporting requirements.

SUMMARY OF THE INVENTION

In part to address the needs identified above, the present invention relates to a selectively programmed computer based system operated by a financial institution (or vendor thereof) to manage its compliance operations. The programmed system allows for enhanced operation to permit the financial institution to comply with its due diligence, reporting and monitoring obligations under FACTA or similar regulations. Specifically, the present invention implements a computer-based Enterprise Data Quality (EDQ) platform for the collection, coordination, interpretation and management of customer financial data.

It is an object of the invention to gather data feeds from various systems and support more effective on-boarding of customers while checking for U.S. indicia in their account information.

It is another object of the invention to monitor notifications via email and tracks "cure" documentation expiry dates.

It is yet another object of the invention to enable an accessible audit trail. It is a further object of the invention to support external reporting through "data extract."

It is another object of the invention to provide a system of record for FATCA compliance.

It is a further object of the invention to standardize customer account and counterparty payee information to enable U.S. indicia searching.

It is another object of the invention to manage alert workflow by Line of Business and alert type.

It is a further object of the invention to prepare a compliance reporting data package for transmittal to the appropriate authorities (i.e. the IRS).

DETAILED DESCRIPTION

Figure 1:
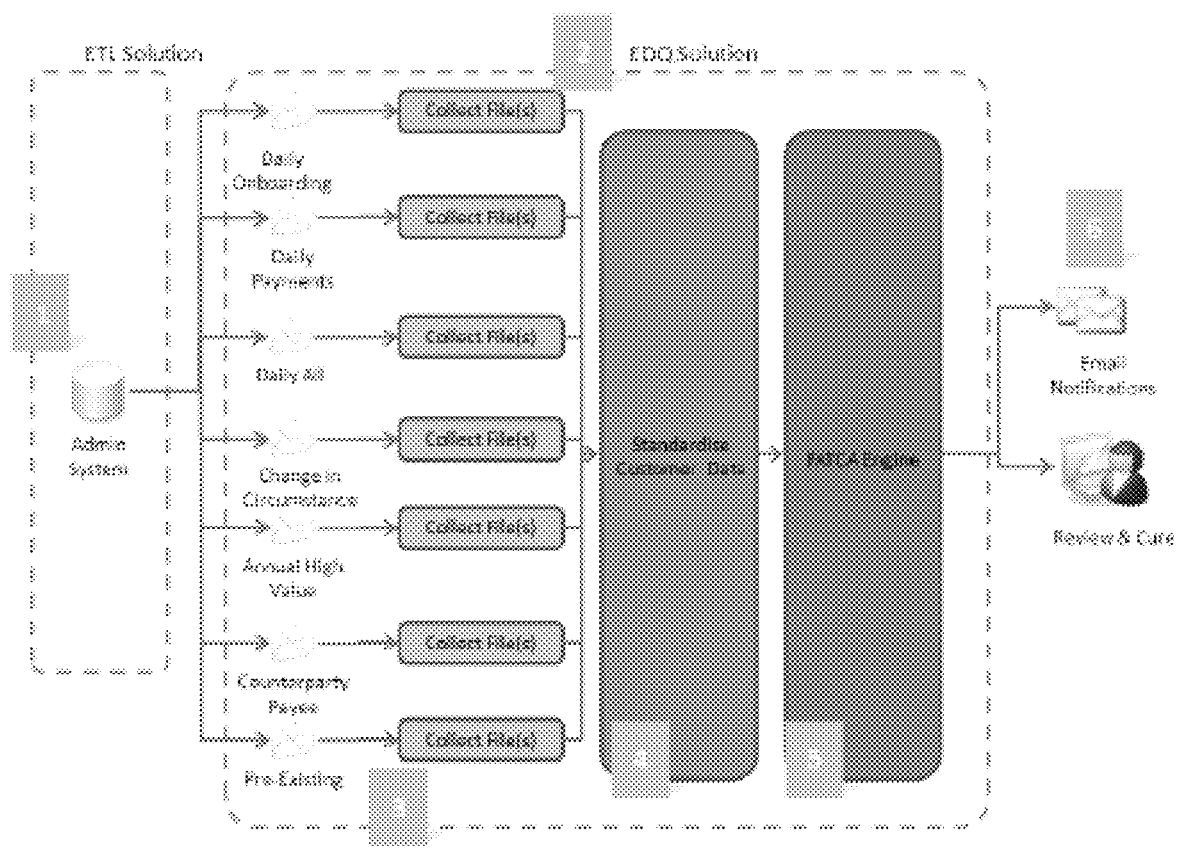
FIG. 1 illustrates an exemplary configuration of the overall EDQ solution where data feeds from existing and real time sources are mined and routed into the data standardization and FATCA Engine protocols.

Certain illustrative embodiments and other aspects of the invention will now be described. However, it will be understood by one of ordinary skill in the art that the methods described herein may be adapted and modified as is appropriate for the application being addressed and that the systems and methods described herein may be employed in other suitable applications, and that such other additions and modifications will not depart from the scope of invention.

The present invention assists a financial services institution in meeting its documentation and reporting obligations under FATCA by processing customer data streams to facilitate screening for U.S. indicia, automate report generation, and create an audit trail. Data streams for new (on-boarded) and existing customers within an organization are identified and selected for processing by the systems and methods for Data Profiling and Data Standardization described below.

The FATCA Rules Engine screens the standardized data and flags those that meet certain U.S. indicia requirements.

Certain aspects of the present invention may be implemented on commercially available enterprise data quality solutions. One such suitable platform is Oracle's Enterprise Data Quality (EDQ).

Data Profiling

Data Profiling is performed to assess the quality and completeness of a customer data stream as it relates to FATCA, as well as to confirm the structural validity of the data provided for FATCA processing. This is a technical assessment of the data involving an overview of each data field collected with a focus on fields mandatory for FATCA indicia searches.

The objectives of the Data Profiling process are: (i) Identify issues in data structure; (ii) Identify files/records missing critical data; (iii) Identify records containing invalid information (e.g., a "Y" where a "T" is required); (iv) Identify any improperly structured date strings; (v) Identify Unrecognized country names/codes; (vi) Identify records containing conflicting information (e.g., A record for an Individual with an Entity only attribute defined); (vii) Identify and determine issues that must be fixed at source versus issues that can be addressed in the data preparation project. (viii) Create a "Data Profile Report" for use in the Data Preparation process. The Data Profile Report is created for each customer file and details all of the key aspects of the incoming data feed.

The following categories of validation are performed:

Missing information. Generally, if it is noted that individuals, entity or beneficiary information is not present in the provided data extract, further follow-ups were conducted to ensure that information from all available in-scope systems was provided. For the specific treatment of missing or incomplete data in each field:

Fields that are Required for FATCA Indicia Check. If a field fails to meet the pre-defined threshold for FATCA-mandatory fields, it is considered incomplete and follow-up is necessary with the country to confirm that they will make the necessary changes in their systems to ensure that the fields are made mandatory going forward. This information and their ETA to complete this work are recorded in the Data Profiling Report. These are marked for further escalation to compliance.

Fields that are Otherwise Required by Compliance. Missing or incomplete fields that are otherwise required by compliance (e.g. DOB, Family Name, etc.), are included in the Data Profiling Report, and confirmation is requested that the data provided is a complete representation of what is currently available. These are marked for further escalation to compliance.

Fields Required for Curing. Missing fields or incomplete fields that are required for Curing (GIID, NI_NUMBER, etc.) are documented, but do not require any escalation.

Non-Mandatory Fields. Missing or incomplete fields that are not considered mandatory (JOB_TITLE, REFERENCE_INFORMATION, etc.) are documented, but do not require any escalation.

Customer information not unique. The ID fields (particularly the combination of all four) should provide a unique identification for each record. Other fields need not be unique, but patterns of duplicates across multiple records are flagged for potential inconsistencies in the extraction process.

Integrity inconsistencies. For entity customer records and individual customer records, different fields are used to discern between the two (e.g. first name, last name fields versus company name fields). Thus, customer records should have data entered in one or the other field types, but never both. Various fields have pre-defined values, as defined by the extraction guidelines, thus invalid data values must be addressed. For example: Beneficiary Flag field should only have the values Y or N to indicate whether the record is a beneficiary record. Any other values in this field are considered invalid.

Invalid data type/format. Dates and other fields are expected in specific formats that are able to be recognized by EDQ.

Invalid or unsuitable range of values. Default values, or values outside a pre-defined range are identified (e.g., repeated entries that look like they have been defaulted such as "XXX"). Follow-up with the country may be required to confirm that these are not errors in the extraction process.

Invalid ISO country code/name. EDQ recognizes countries by their two-character ISO country codes or standardized names. If country fields contain data in other forms, follow-up is necessary to request a change in the extraction process or to provide a lookup table that can be used to transform the countries into ISO country codes.

Field not delimited by pipe. Since often customers have multiple telephone numbers and values for the country-related fields, local IT teams are instructed to separate distinct values by pipes within the fields.

Data Standardization

Data Standardization (or "Data Preparation") is performed on a data stream after Data Profiling to ensure that the different representations of data in each location are normalized into a format that can be consumed, recognized and processed by the EDQ FATCA Rules engine. This process involves the standardization of various fields, the incorporation of multiple lookup tables, and normalization into specified formatting.

Data Preparation is an important component of the overall FATCA solution. Each customer record provided within the incoming data feeds (supplied by individual business units) is prepared into a standard format with each customer attribute being transformed into a normalized form where appropriate. For example, transforming country names into 2-digit ISO country codes or standardizing a company suffix from Limited to LTD.

The Data Preparation process may be subdivided into process modules, wherein each process module is configured to process one or more data attributes (or data fields). This configuration allows for individual process modules to be enabled, disabled or reordered to optimize the overall process according to the needs of the application.

Data Preparation profiles can be created for individual business units or locations that are tailored to the needs identified in the Data Profile Report. For example, the report produced for a particular business unit may identify the "location" field as improperly formatted as all capital letters. The corresponding Data Preparation profile applied to data streams originating from that business unit would include a process module for altering the location field formatting to use proper capitalization conventions. The process modules may be further configured to generate a report comprising the results of each sub process.

The following are process modules that may be included. The specific names referenced for process modules, subprocesses, values, attributes, fields and variables are illustrative only:

Initial Count. The purpose of this check is to count the total number of records entering the data preparation process. This can be done by counting unique record identification numbers or other identifying characteristics of individual records. This number will later be used to cross reference with the number of records being written out by the data preparation. This cross referencing of the incoming count against the outgoing count is a basic, but critical check to ensure no records are lost during the preparation. For example records, with invalid dates are not filtered out but tagged appropriately.

It is expected that there can be some fluctuation in the number of records due to de-duplication and splitting of records where multiple values are provided, however any difference between the number of incoming and outgoing records should be investigated.

Refine Incoming Data. This module is designed to perform basic data preparation refinements which can be applied to all incoming attributes. For example, normalizing the white space for all attributes. Specific attribute standardization should be performed in their respective module. This module can also add further basic refinements to the incoming data. For example, it may be necessary to de-noise certain characters from the incoming customer records.

Identify Customer Type. This module is used to check for individual name data to see if the customer is an Individual or Entity, and serve as an additional check to verify that all incoming records have either an individual or entity name.

Create Composite ID. This module is used to consolidate the four ID attributes provided in the customer data feed into a single attribute. This is performed to simplify ID comparisons. The unique ID will be generated in the FATCA engine using the customer data including IDs.

Individual Names. This module combines the Individual's name into a single Full Name attribute, and ensures that no unrelated name data is concatenated into the name. For example, if a middle name has a default value not related to the individuals name.

Entity Names. This module converts the TRADING_COMPANY_NAME and REGISTERED_COMPANY_NAME attributes to upper case.

Entity Name Normalization. This module builds on the work of the "Entity Names" module and creates both dnREGISTERED_COMPANY_NAME and dnTRADING_COMPANY_NAME adding two new attributes. The two new attributes added by this module must be passed into the proceeding parsers, therefore any refinements must output these two attributes.

Trading Company Name Standardization. This module is used to create the dnTradingCompanyNameStandardized attribute which is to be passed to the FATCA engine.

Registered Company Name Standardization. This module is used to create the dnRegisteredCompanyNameStandardized attribute which is to be passed to the FATCA engine.

Telephone Numbers Capture. This module splits the customer record into multiple records where several telephone numbers are provided. De-duplication is also performed. It may be necessary to change the delimiter specified in the process "Split Multiple Telephone Numbers" if a pipe is not used to separate the telephone numbers.

Telephone Numbers. Checks what has been achieved. For example, the number of records added or removed, the telephone number values should also be checked to make sure no default values are being used (e.g., "123"). Reviews the number of customer records and check these are in line with the expected number of customer records.

Create Full Address. A concatenation of all of the address fields, excluding country. This module creates a single address block delimited by a pipe ("|"). This attribute will later be used to pass out the original address to the FATCA engine.

Refine the Address details. The address details are integral to the identification of U.S. indicia in the customer record. Therefore it is essential that the preparation of the address data is accurate. The purpose of this module is pass through the standardized address details however if the address is unstructured then structure is applied using EDQ. The objective is to have the address as granular as possible to allow the U.S. indicia to be more accurately identified. The Address details block is designed to work in one of two ways:

1. Where the address is provided in separate attributes (i.e. the Address line 1 attribute contains the first line of the address, the city attribute contains the city details):
    a. Then all the attributes will be mapped to the corresponding "dn" version (i.e. Address Line 1 will go to dnAddressLine1). The current configuration is designed to take the first element of the dnFullAddress, therefore the select element from array process "Create dnAddress1" will need to be changed for a concatenate process. City is already set up this way. This change will need to be applied for each of the addressLinex attributes.
2. Where the address is provided in a single, unstructured block (i.e. all of the address data is supplied in addressline1).
    a. It is expected that there will be some structure to the address provided and therefore the address fields will be delimited by a persistent value, such as a comma. The process "Split Address_Full_Raw" takes a string value and turns it into an array. Therefore the delimiter used here will need to be changed from a pipe ("|") to the appropriate type.
    b. With the array created the size is required to identify how many elements have been created with the process "Return Address Array Size." Map elements 1 to 3 to dnAddressLine1 to dnAddressLine3. All remaining array elements can be mapped to dnAddressLine4. Discretion should be used here, if it is possible to consistently identify a city, state or country then these should be mapped to their corresponding dn version. For example if we know that city is always array element 5 then this should be mapped to the dnCity attribute instead of the current city attribute.

Address Information. This module contains a simple frequency profiler that can be used to verify the address values being assigned to the "dn" prefixed attributes. Review the results of frequency profiler in this module to verify the values assigned to the "dn" prefixed attributes are suitable, fit for purpose and no data has been removed. Should further details be required then a QuickStats profiler may be required. Remove any profilers once the data preparation has been completed.

ISO Country Extraction: Address Country, Residency Countries, Birth Country, Nationality Countries, REGISTRATION Country, OPERATING Country. ISO Country Extraction is applied to all of the country fields and is designed to take in the values provided and ensure these are transformed into their corresponding ISO 2 digit country codes. The mechanism for identifying the ISO country codes is as follows:
1. The country data supplied to the module (e.g. Nationality) is turned into an array of countries, before the records are split by each array attribute. For example, if two nationality countries are provided, GB and U.S., the customer record is split in two so we have one record with GB and one with U.S. The record is later consolidated back into a single record.
2. The process looks for the existence of a valid ISO code in the country field for said module. If one is found it the attribute «country type». FromISOCountryCode is added to the customer record.

3. If a valid ISO is not identified "Lookup «country type» Country as ISO 3660 Country Name—First Pass" is used to see is an ISO country name has been provided.
4. If an ISO country name is not provided, a subroutine "Get Standardised Country name" is used to transform the name provided into its ISO country name form. It is common for non-ISO names to be used (e.g., "Iran" is used instead of "The Islamic Republic of Iran"). This check has a reference data that is used to look up on known non-ISO names return the ISO name. Subroutine "Lookup Country as ISO 3660 Country Name—Second Pass" is used to transform the ISO country name to the corresponding ISO country 2-digit code.
5. The final check is to identify a country using a business unit specific reference. It is possible that a business unit will have their own country codes (e.g. 100=Spain). In these instances we can use the reference data "Country Code from Value" to map the business unit value to an ISO country code.
6. The customer records which were split in step 1 is consolidated back into individual customer records.

Date Refinement. The dates are required in the format "yyyymmdd". However the application is configured to receive and process other formats. The accepted formats are found in the reference data "*Date Formats", which can be edited to accept other formats. The no data check subprocess "«date» present?" and the subprocess "Invalid «date»" will assist in identifying where dates were not transformed.

SYSTEM Refinement. This module allows for the system name provided to be replaced with a more suitable name. For example, if the system comes in as "TK421" the users might know it better as "Finance". The reference data "FATCA: SYSTEM identification" can be updated so that where the value in the system column is found it will be replaced with the value in the system_friendly column. If no replacement is necessary no value is returned and EDQ will use the original System value. Note that any further enhancements added here must still output the final value as dnSystem in the merge attribute processor. This avoids any mapping changes downstream.

SOURCE_TYPE Refinement. This is module converts the source_type attribute to upper case. Should any further refinements be necessary such as de-noising or replacing values these must be done before the merge attribute processor so that the output of this module remains dnSource_Type. The merge processor offers flexibility so that we can amend the attribute and not have to change any mapping downstream.

Create Feed Name. This attribute will be used to set the Feed name of the incoming file. During the manual running of the data preparation this attribute will not be changed. Once all of the data preparation has been completed the data preparation should be run using the appropriate external task as described at the end of this document.

STATUS_CODE Refinement. This module that converts the status_code attribute to upper case. Should any further refinements be necessary such as de-noising or replacing values these must be done before the merge attribute processor so that the output of this module remains dnStatus Code. The merge processor offers flexibility so that we can amend the attribute and not have to change any mapping downstream.

GIIN ID Structure Check and Refinement. This module checks the structure of the GIIN ID (Global Intermediary Identification Number) provided to ensure it has been provided in the correct format. Where an invalid GIIN is provided, the output will be set to XXXXXX-11111-XX-111.

GIID Type Refinement. This module checks the GIID (Government Issued ID) Type provided is a known and valid type. Any documents that are invalid will be displayed as 'INVALID GIID DOCUMENT TYPE' within Case Management.

GIID. This module that converts the GIID attribute to upper case. Should any further refinements be necessary such as de-noising or replacing values these must be done before the merge attribute processor so that the output of this module remains dnGIID.

BENEFICIARY Refinement. This module performs a lookup and return which normalizes the value in the beneficiary attribute to a Y or N where a value is presented.

ENT_SELF_CERT_FATCA_CLASS Refinement. This module performs a check to verify the Entity Self Certification FATCA Classification attribute contains an acceptable value. If an unacceptable value is passed to EDQ then the standardization process transforms the non-standardized value to its standard form. In the event the value cannot be transformed to a standard value the value will be replaced with "[E] INVALID_ENTITY_SELF CERT CLASSIFICATION" This is to ensure the integrity of the values populated in this attribute, should a non-standard value be populated then case management will not be able to update this attribute manually due to a data conflict.

FATCA_Classification Refinement. This module performs a check to verify the FATCA Classification attribute contains an acceptable value. If an unacceptable value is passed to EDQ then the attribute will be passed through but classified as 'Invalid Classification from Source System'.

REL_MAN_INQ_COMPLETE Refinement. This module converts the REL_MAN_INQ_COMPLETE (Relationship Manager Inquiry Complete) attribute to upper case and checks that the value provided from the source system is valid. Any invalid values will be classified as 'INVALID CLASSIFICATION FROM SOURCE SYSTEM'. Should any further refinements be necessary such as de-noising or replacing values these must be done before the merge attribute processor so that the output of this module remains dnREL_MAN_INQ_Complete.

ADDITIONAL_DOCUMENT_TYPE Refinement. This module performs a number of checks if the value provided in the ADDITIONAL_DOCUMENT_TYPE attribute is an accepted value and if not then the value displayed in Case Management is 'INVALID ADDITIONAL DOCUMENT TYPE'.

Information. This module contains a frequency profiler that checks the attributes prefixed with "dn". The results of the frequency profiler should be reviewed to ensure that no data is lost and the correct values have been applied to the "dn" values.

Refine NI_NUMBER. This module converts the NI_NUMBER attribute to upper case. Should any further refinements be necessary such as de-noising or replacing values these must be done before the merge attribute processor so that the output of this module remains dnNI_NUMBER.

Refine REMARKS. This module converts the REMARKS attribute to upper case. Should any further refinements be necessary such as de-noising or replacing values these must be done before the merge attribute processor so that the output of this module remains dnREMARKS.

Refine REFERENCE_INFORMATION. This is module converts the REFERENCE_INFORMATION attribute to upper case. Should any further refinements be necessary such as de-noising or replacing values these must be done before the merge attribute processor so that the output of this module remains dnREFERENCE_INFORMATION.

Final Count. The purpose of this check is to utilize the mandatory attribute "ID1" to count the total number of records leaving the data preparation process. This number should be cross referenced with the number of records coming into data preparation. This cross referencing of incoming vs. outgoing is a basic check to ensure no records are lost during the preparation, for example records with invalid dates are not filtered out but tagged appropriately. Note the number of incoming records and compare this to the number of outgoing records when data preparation is completed. It is expected that there can be some fluctuation in the number of records due to de-duplication and splitting of records where multiple values are provided, however any difference in the number of incoming compared to the number of outgoing records should be investigated.

Dynamically add incoming file details. This module tags the records that have been processed with some dynamic values such as File Name and Business Unit.

IRS Expiry Date Refinement. This module converts the IRS_FATCA_CLASSIFICATION_EXPIRY_DATE attribute from a String to a Date format.

CustomerData_Prepared. This module writes out the data that will be consumed by the FATCA engine.

FATCA Engine

Figure 2:
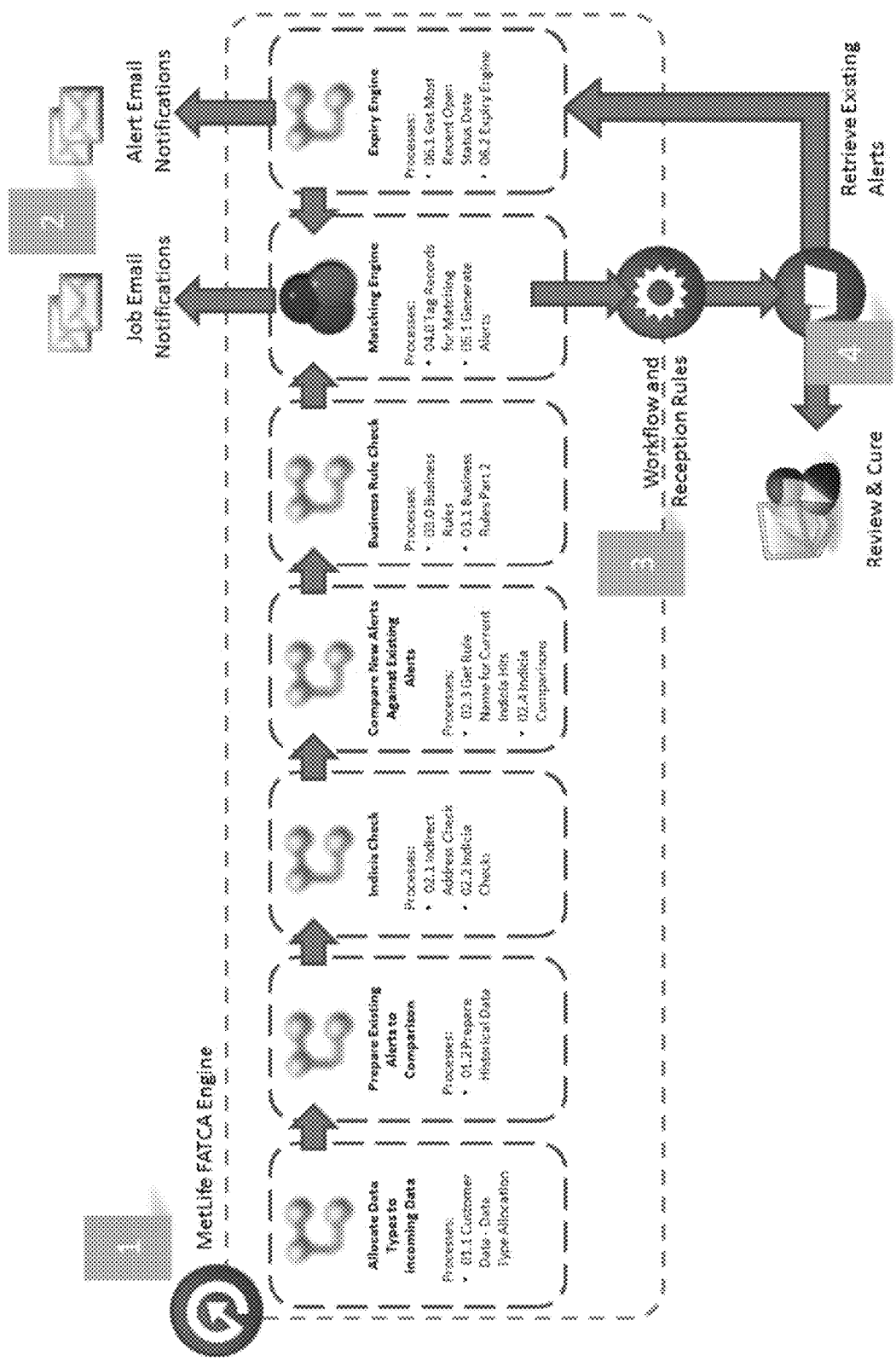
FIG. 2 illustrates an exemplary configuration of the various data process modules of the FATCA Engine.

The FATCA Engine is made up of 7 main component areas which collectively perform the tasks required to screen customer records in accordance with an organization's FATCA policy. Each component is described below. FIG. 2 illustrates the overall structure of the FATCA Engine components in one embodiment. The specific names referenced for process modules, subprocesses, values, attributes, fields and variables are illustrative only:

Allocate Data Types to Incoming Data: is comprised of a processor "01.1 Customer Data—Data Type Allocation". The purpose of this processor is to allocate data types to the records passed in from the prepared .csv file produced by the business unit's data preparation project (e.g. Convert the string value used for D.O.B to a Date type). In addition, all incoming fields are checked for special characters such as ASCII control characters, which are removed to ensure screening is accurately performed.

Prepare Existing Alerts for Comparison: is comprised of a processor "01.2 Prepare Historical Data". The purpose of this processor is to read in the current alerts held in Case Management and record their current status including indicia rule hits. This information will then be used to review changes to any customer information provided in the incoming feed, for example more indicia have been identified.

Indicia Checks: Is made comprised of up of two processes "02.1 Indirect Address Check" and "02.2 Indicia Checks." The first checks whether only an indirect address(es) has been provided for a customer, such as P.O. Box. If this is found to be true the customer record is flagged accordingly to reflect this fact. Later the business rule logic will review this flag and it will trigger a Business Rule hit, which if no other indicia have been found will force an alert to be created. The second processor is where the customer records are checked for U.S. indicia, for example the customer record has a U.S. state and U.S. city in its address.

Compare New Alerts Against Existing Alerts: is comprised of the processes "02.3 Get Rule Name for Current Indicia Hits" and "02.4 Indicia Comparisons." The first uses the information from the Indicia checks processes to assign the indicia rule names that the new records have/will hit. Indicia Comparisons then takes this input and uses it to work out the changes in the indicia and where changes are identified, the records are flagged accordingly. The business rules will then use these flags, as explained below.

Business Rule Check: Is formed of the processes "03.0 Business Rules" and "03.1 Business Rules Part 2." The first process forms the primary component of the Business Rule Check, which persists the extended attributes information (e.g. GIID Type) and tags records when they satisfy a business rule (e.g. Entity name change). Then, Business Rules Part 2 is used to tag records with no Indicia status taking into account the status across all working records for a customer. This check is used to see if any of the working records for a customer have indicia or not.

Matching Engine: Is comprised of the processes "04.0 Tag Records for Matching" and "05.1 Generate Alerts." Tag Records for Matching reviews all of the information that has been applied to a working record thus far in the FATCA Engine and tags these records with the information that indicates which rule(s) the record will hit. Generate Alerts takes the tags applied by the previous process and uses this information to generate the alert. For example, if a record has U.S. Country of Operation identified, Tag Records for Matching will add the tag to this record with "OPS", Generate Alerts will then match this to the list of rules (i.e. looking up on OPS and displaying the rule "[INDICIA] U.S. Country of Operation").

Expiry Engine: Is formed of the processes "06.1 Get Most Recent Open Status Date" and "06.2 Expiry Engine". "06.1 Get Most Recent Open Status Date" is used to identify the most recent open status for an alert, this is then used by the 06.2 Expiry Engine to work out how long an alert has been open. "06.2 Expiry Engine" reviews every alert in Case Management and checks all document expiries and cure timers. Should a document be set to expire within 90, 60 or 30 days, an email warning is sent out to the appropriate users. The alerts are also reviewed on how long they have been open and should they be within 90, 60 or 30 days for their cure timer an appropriate email is sent out. Not all alerts are subject to cure timers and not all feeds are subject to the same cure timer duration.

Compliance Package Preparation

The U.S. tax authority, the IRS, requires reporting the assets of customers (individuals and organizations) that fall within the scope of the FATCA reporting requirements. Currently, this typically applies to those customers with specified foreign assets that exceed a certain threshold.

The IRS manages the International Data Exchange Services (IDES) which serves as an electronic gateway for financial institutions to electronically exchange global FATCA data with the United States. IDES provides secure file data transfers and uses encryption standards established by the United States National Institute of Standards and Technology (NIST). When a supported web browser connects to IDES via HTTPS, the Transport Layer Security (TLS) cryptographic protocol provides communication security over the Internet and the session is encrypted for data confidentiality.

Figure 3:
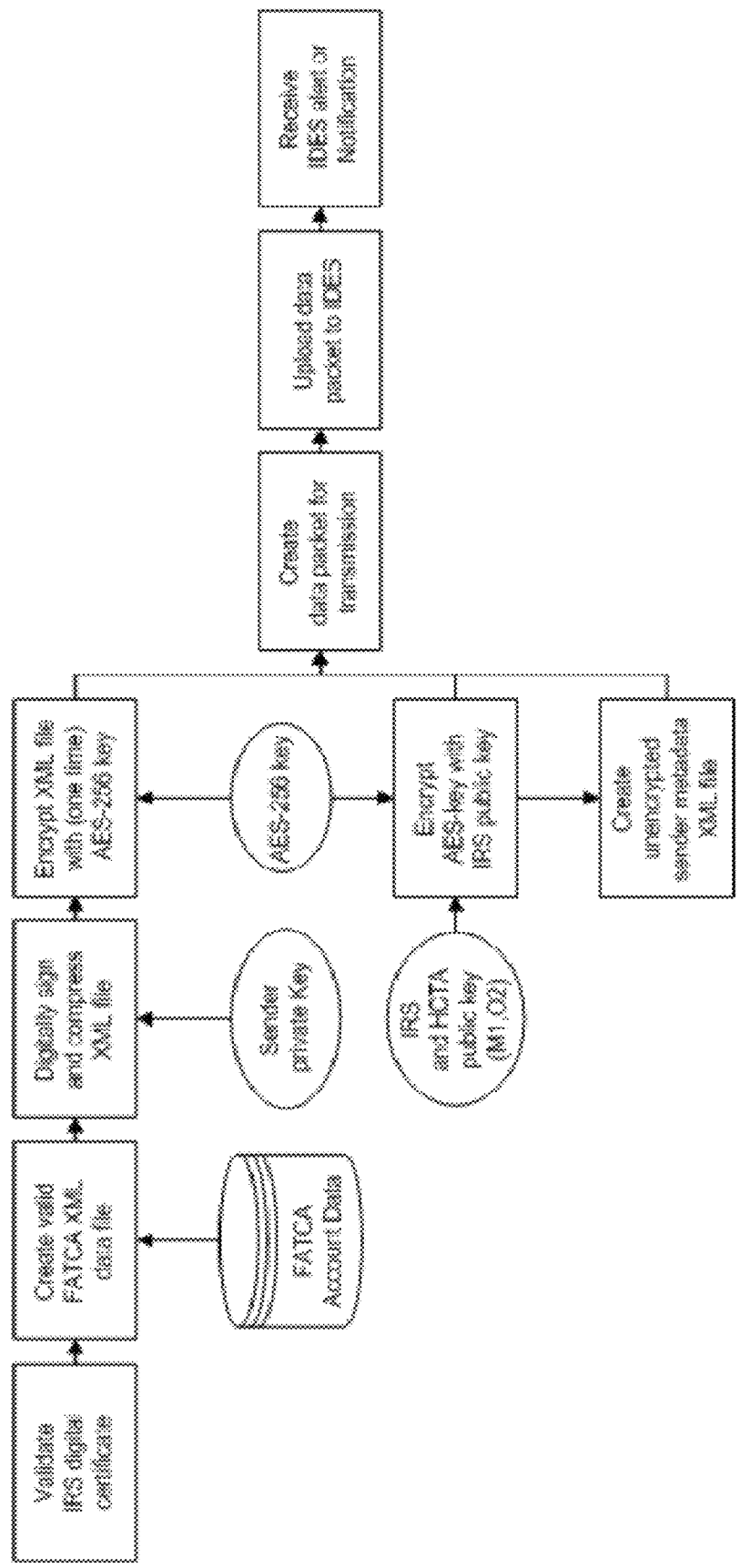
FIG. 3 illustrate a process flowchart for preparing a compliance data package to be transmitted through the International Data Exchange Services (IDES).

Before a compliance data package is transmitted to the IRS through IDES, it must be prepared in accordance with IRS specifications (described in detail in FATCA XML Schema v1.1 User Guide, IRS Publication 5124, fully incorporated herein by reference). As a supplement to the EDQ platform described above, the present invention may also feature a tool programmatically designed to facilitate the processing of relevant account data into an FATCA compliant data package for submission through IDES. The tool performs the following steps, which are also illustrated in FIG. 3:

(1) Prepare a FATCA XML file with appropriate data to be reported and in line with the mentioned schema rules and policies
(2) Digitally sign the XML file
(3) Compress the digitally signed FATCA XML file
(4) Encrypt the FATCA XML file with AES-256 key
(5) Encrypt the AES key with the public key of each recipient
(6) Create the sender metadata
(7) Create the final data packet for transmission
(8) Decrypt the return notification and files from IDES These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. A computer-implemented method for processing data in compliance with Foreign Account Tax Compliance Act (FATCA), comprising:
   receiving incoming data in the form of a first electronic file by an FATCA engine; and
   correcting, by the FATCA engine, the incoming data to comply with the FATCA, by:
      automatically allocating, by a first processor of the FATCA engine, data types to the incoming data by automatically converting a data record of the incoming data from a first data type to a second data type, wherein the data types are predefined in a second electronic file;
      automatically removing, by the first processor, special characters from the incoming data;
      retrieving, by a second processor of the FATCA engine, from a non-transitory computer readable medium, current alerts;
      recording, by the second processor, current status of the current alerts including indicia rule hits;
      automatically identifying, by the second processor, indicia from the incoming data based on the indicia rule hits;
      flagging, by a third processor of the FATCA engine, the data record of the incoming data when only an indirect address has been provided in the indicia of the incoming data;
      checking, by the third processor, the indicia of the incoming data for U.S. indicia;
      automatically comparing, by a fourth processor of the FATCA engine, the indicia of the current alerts with the indicia identified from the data record to identify a change in the data record and flagging the data record when the change is identified;

reviewing the flagged data record, by a fifth processor of the FATCA engine, to determine whether the flagged data record meets one or more business rules;
automatically generating, by a sixth processor of the FATCA engine, one or more alerts to the customer when the data record meets the one or more business rules;
automatically identifying, by a seventh processor of the FATCA engine, for each alert, remaining time available for correction before expiration;
automatically comparing, by the seventh processor, for each alert, the remaining time available for correction with a threshold value; and
automatically sending, by the seventh processor, an email to the customer when the remaining time available for correction is within the threshold value,
processing the corrected incoming data into an FATCA compliant data package for submission through an International Data Exchange Service (IDES) by:
validating an Internal Revenue Service (IRS) digital certificate;
automatically preparing a FATCA XML file with the corrected incoming data;
digitally signing and compressing the FATCA XML file using a sender private key;
encrypting the digitally signed and compressed FATCA XML file with an AES-256 key;
encrypting the AES-256 key with an IRS public key of each recipient;
creating an unencrypted sender metadata XML file;
automatically creating a final data packet for transmission using the encrypted FATCA XML file, the encrypted AES-256 key with the IRS public key, and the unencrypted sender metadata XML file;
uploading the final data packet to the IDES via a Transport Layer Security cryptographic protocol for data confidentiality;
receiving a return notification from the IDES; and
automatically decrypting the return notification from the IDES.

2. The computer-implemented method of claim 1, further comprising:
determining, by the FATCA engine, that the incoming data includes an indirect address of the customer;
adding, by the FATCA engine, a flag to the incoming data indicating that the incoming data includes the indirect address; and
generating, by the FATCA engine, a new alert based on the added flag.

3. The computer-implemented method of claim 1, further comprising:
determining, by the FATCA engine, that the incoming data includes state and city information of a predefined country.

4. The computer-implemented method of claim 1, wherein for each alert, the FATCA engine checks its expiration and cure timer, and sends an email warning when the alert is set to expire within a predetermined number of days.

5. The computer-implemented method of claim 1, wherein for each alert, the FATCA engine determines how long the alert has been open and its cure timer, and sends an email warning when the cure timer is within a predetermined number of days.

6. A system for processing data in compliance with Foreign Account Tax Compliance Act (FATCA), comprising:

a non-transitory computer readable medium; and
an FATCA engine with one or more processors configured to:
receive incoming data in the form of a first electronic file; and
correct the incoming data to comply with the FATCA, by:
automatically allocating data types to the incoming data by automatically converting a data record of the incoming data from a first data type to a second data type, wherein the data types are predefined in a second electronic file;
automatically removing special characters from the incoming data;
retrieving, from the non-transitory computer readable medium, current alerts;
recording current status of the current alerts including indicia rule hits;
automatically identifying indicia from the incoming data based on the indicia rule hits;
flagging the data record of the incoming data when only an indirect address has been provided in the indicia of the incoming data;
checking the indicia of the incoming data for U.S. indicia;
automatically comparing the indicia of the current alerts with the indicia identified from the data record to identify a change in the data record and flagging the data record when the change is identified;
reviewing the flagged data record to determine whether the flagged data record meets one or more business rules;
automatically generating one or more alerts to the customer when the data record meets the one or more business rules;
automatically identifying, for each alert, remaining time available for correction before expiration;
automatically comparing for each alert, the remaining time available for correction with a threshold value; and
automatically sending an email to the customer when the remaining time available for correction is within the threshold value,
process the corrected incoming data into an FATCA compliant data package for submission through an International Data Exchange Service (IDES) by:
validating an Internal Revenue Service (IRS) digital certificate:
automatically preparing a FATCA XML file with the corrected incoming data;
digitally signing and compressing the FATCA XML file using a sender private key;
encrypting the digitally signed and compressed FATCA XML file with an AES-256 key;
encrypting the AES-256 key with an IRS public key of each recipient;
creating an unencrypted sender metadata XML file;
automatically creating a final data packet for transmission using the encrypted FATCA XML file, the encrypted AES-256 key with the IRS public key, and the unencrypted sender metadata XML file;
uploading the final data packet to the IDES via a Transport Layer Security cryptographic protocol for data confidentiality;

receiving a return notification from the IDES; and
automatically decrypting the return notification from the IDES.

7. The system of claim 6, wherein the FATCA engine is configured to:
   determine that the incoming data includes an indirect address of the customer;
   add a flag to the incoming data indicating that the incoming data includes the indirect address; and
   generate a new alert based on the added flag.

8. The system of claim 6, wherein the FATCA engine is configured to:
   determine that the incoming data includes state and city information of a predefined country.

9. The system of claim 6, wherein for each alert, the FATCA engine checks its expiration and cure timer, and sends an email warning when the alert is set to expire within a predetermined number of days.

10. The system of claim 6, wherein for each alert, the FATCA engine determines how long the alert has been open and its cure timer, and sends an email warning when the cure timer is within a predetermined number of days.

\* \* \* \* \*